T. CAMP.
MOTOR HARROW.
APPLICATION FILED APR. 26, 1911.
1,073,026.
Patented Sept. 9, 1913.
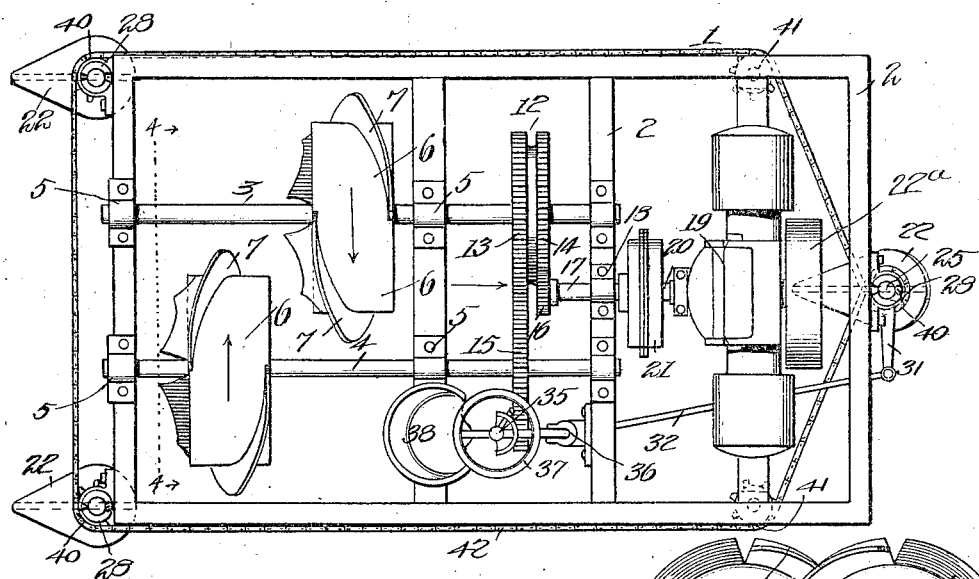
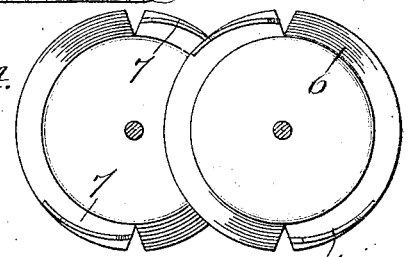
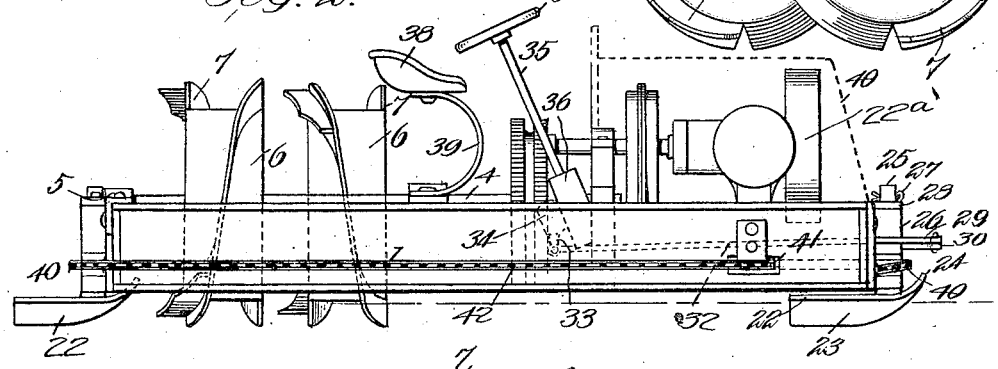
WITNESSES
INVENTOR
THOMAS CAMP
BY Munn & Co.
Attorneys

UNITED STATES PATENT OFFICE.

THOMAS CAMP, OF ATLANTA, GEORGIA.

MOTOR-HARROW.

1,073,026.

Specification of Letters Patent.　　Patented Sept. 9, 1913.

Application filed April 26, 1911. Serial No. 623,342.

*To all whom it may concern:*

Be it known that I, THOMAS CAMP, a citizen of the United States, and a resident of Atlanta, in the county of Fulton, State of Georgia, have invented a new and useful Improvement in Motor-Harrows, of which the following is a specification.

My invention is an improvement in motor harrows and consists in certain novel constructions and combinations of parts hereinafter described and claimed.

The object of the invention is to provide a device of the character specified which will thoroughly cut up and pulverize the soil and which will propel itself through the field by the operation of cutting the soil.

In the drawings: Figure 1 is a plan view of the improvement; Fig. 2 is a side view; Fig. 3 is a partial perspective view of one of the plows, and Fig. 4 is a section on the line 4—4 of Fig. 1.

In the embodiment of the invention shown a substantially rectangular frame 1 is provided, the frame being formed of beams arranged with their widest dimension vertical, and of suitable size and strength to support the operating mechanism, without making the weight of the machine excessive. The side members of the frame are connected by cross bars 2 arranged at spaced intervals, and shafts 3 and 4 are journaled in bearings 5 on the frame, one at each side of the longitudinal center of the frame and parallel with each other. Each shaft is provided with a cutting device, the devices being similar and arranged offset from each other longitudinally of the machine. Each device consists of a cylinder or drum 6 secured on the shaft, and each cylinder is provided on its periphery with a pair of blades 7 and 8 spirally arranged with respect to the cylinder. It will be noticed that each of the blades extends over one-half the periphery of the cylinder or drum to which it is attached. Each cylinder or drum is provided with two blades and each blade is arranged on the opposite side of the cylinder or drum from the other blade. The blades are similar, each being flush at its ends with the faces of the cylinder, and a point 9 is arranged at the rearward end of each blade. Each of the points 9 is set at an angle to the blade, Fig. 3, and the points are held to the blade in any suitable manner. The blades being perpendicular to the peripheral surface of the cylinder, the points are also inclined with respect to the faces of the cylinder, and one corner 10 of the point extends beyond and in front of the adjacent face of the cylinder.

The shaft 3 is provided with a disk 12 having a plurality of rings 13 and 14 of gear teeth. The disk is arranged near the forward end of the shaft, and the ring 13, which is in fact a gear wheel, and may be so constructed, meshes with a gear wheel 15 of the same diameter secured on the shaft 4. The ring 14 meshes with a pinion 16 on a stub shaft 17 journaled in a bearing 18 on the adjacent cross bar 2. A motor 19 of suitable character is mounted on the forward cross bar 2, and the shaft 20 of the motor is connected to the stub shaft 17 by means of a selective gear transmission held in a case 21. The opposite end of the motor shaft is provided with a fly wheel 22ª and it will be evident that the shafts 3 and 4 will be driven at the same speed, and in opposite directions, when the motor is clutched to the stub shaft. By means of the transmission the speed of rotation of the shaft may be regulated, or it may be reversed.

The frame 1 is supported by runners, each consisting of a substantially triangular plate 22 provided with a central depending fin or rib 23 on its lower face. The plates 22 are arranged with their apexes to the rear, and the base of each plate is rounded from side to side. The plate is curved longitudinally, the forward rounded base being bent upward, as shown at 24 in Fig. 2, in the shape of a runner. The fin 23 is cut away on an incline at the front of the runner and each plate is provided with a journal pin 25 near its front end and in its long axis. Each pin 25 is received in a vertical bearing 26 secured to the frame, and is held from downward movement by a cotter pin 27. A washer 28 is arranged between each cotter pin and the bearing. A runner is arranged near each side of the rear end of the frame and one runner is arranged at the center of the front end. The journal pin of the runner at the front of the frame is provided with a radial arm 31, and the arm is connected by a link 32 to a radial arm 33 on a worm wheel 34 journaled on one of the cross bars 2. The worm wheel meshes with a worm (not shown) on a shaft 35 journaled in a bearing sleeve 36 on the frame, and provided at its upper end with a hand wheel 37. A seat 38 is arranged behind the shaft 35 and is supported by a spring plate 39 secured to the frame. A suitable hood 40 may be arranged over the motor and over the front of the frame.

In operation, the machine is drawn through the field by the cylinders or drums. The engagement of the blades with the ground forces the frame forwardly on the runners, and the frame may be turned to the right or left to guide it through the field by swinging the runners. The fins or ribs 23 engage in the ground and prevent any lateral slipping of the runners. As the cylinders or drums turn, the blades 6 and 7 thoroughly cut up the soil, while, at the same time, they push the frame forwardly. When used as a harrow, the points are omitted. The device may also be used to propel a gang of plows. In this instance, the blades thoroughly cut up the soil, while the plows turn a furrow.

In Fig. 1 is shown the mechanism for constraining the runners to move together. Each of the pins 25 is provided with a sprocket wheel 40 secured thereto, and other sprocket wheels 41 are journaled on the frame on each side of the engine. A chain 42 passes over the sprocket wheels, so that when the front runner is turned in one direction, the rear runners are turned in the opposite direction. The runners may be adjusted vertically by loosening the sprocket wheel, and slipping the pin through the said wheel.

The arrangement of the blades prevents any clogging of the earth between the said blades. An inspection of Fig. 1 will show that each end of blade 7 is opposite an end of blade 8, that is, each of the blades commences where the other leaves off, and at no point on the periphery of the cylinders or drums is there a groove or passage between the blades to catch and hold the dirt, and thus to cause a clogging of the plow. The blades are always free and clean. The adjacent faces of the cylinders or drums are almost in alinement, as will be evident from an inspection of Figs. 1 and 2, and the said faces overlap, so that that portion of the earth between the shafts is thoroughly cut up and harrowed. This would not be the case were the shafts spaced to prevent the cylinders or drums overlapping. When the plow point is in place and the cylinders or drums are rotating, the said point enters the earth in such position that the mold board inclines upwardly and lifts the soil upward toward the cylinder or drum. The said points throw the earth beyond or behind the edge of the cylinder or drum, and a furrow is formed between the two shafts.

Runners are used in preference to wheels, because were wheels used, the said wheels must necessarily be of small diameter and in rough ground they would drop into holes, thus making the plowing irregular. The runners are of a length sufficient to support the machine on practically a level keel as it passes over the ground, and the said runners prevent the dropping of the machine into ruts and the like, thus cultivating the earth at practically the same depth. In addition, the runners being of considerable area support the machine better when the ground is soft, since they do not sink so deep into the earth.

It will be understood that when used at all, each of the cylinders or drums is provided with two points, in order that the said points may counterweight each other and balance the machine. The plowing devices not only stir up the ground as a plow, but are also utilized to propel the machine over the ground.

I claim:—

1. In a device of the character specified, a plow comprising a cylinder or drum, cutting blades arranged spirally of the periphery of the cylinder or drum, said blades being oppositely arranged and each extending over approximately one-half the circumference of the drum, and a point connected with each blade, said points being at diametrically opposite points on the cylinder.

2. In a device of the character specified, a plow comprising a cylinder or drum, cutting blades arranged on the periphery of the cylinder or drum and spirally with respect to the axis thereof, said blades being oppositely arranged and each extending over approximately one-half the circumference of the said cylinder or drum.

THOMAS CAMP.

Witnesses:
Thos. J. Avery,
W. W. Springer.